United States Patent
Kaneko

(10) Patent No.: US 7,660,113 B2
(45) Date of Patent: Feb. 9, 2010

(54) THIN DISPLAY

(75) Inventor: Takuji Kaneko, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 0 days.

(21) Appl. No.: 12/141,628

(22) Filed: Jun. 18, 2008

(65) Prior Publication Data

US 2008/0315059 A1    Dec. 25, 2008

(30) Foreign Application Priority Data

Jun. 19, 2007    (JP)    ............................. 2007-161181

(51) Int. Cl.
G06F 1/16    (2006.01)
(52) U.S. Cl. ................................ 361/679.59
(58) Field of Classification Search ............ 361/679.59, 361/679.21; 248/425, 917–921
See application file for complete search history.

(56) References Cited

U.S. PATENT DOCUMENTS

| 5,100,098 | A | * | 3/1992 | Hawkins | ................. | 248/291.1 |
| 5,375,076 | A | * | 12/1994 | Goodrich et al. | ....... | 361/679.17 |
| 5,871,094 | A | * | 2/1999 | Leibowitz | .................. | 206/320 |
| 6,418,010 | B1 | * | 7/2002 | Sawyer | .................. | 361/679.05 |
| 6,651,943 | B2 | * | 11/2003 | Cho et al. | ................. | 248/122.1 |
| 7,143,478 | B2 | * | 12/2006 | Quijano | ....................... | 16/445 |
| 2004/0084588 | A1 | * | 5/2004 | Liu et al. | ................. | 248/291.1 |
| 2007/0127197 | A1 | * | 6/2007 | Tae et al. | .................... | 361/681 |

FOREIGN PATENT DOCUMENTS

| JP | 63-153675 | U | | 10/1988 |
| JP | 4-44778 | U | | 4/1992 |
| JP | 2003-263116 | A | | 9/2003 |
| JP | 2004-336433 | A | | 11/2004 |
| JP | 2006-301211 | A | | 11/2006 |
| JP | 2006301211 | A | * | 11/2006 |
| JP | 2007235692 | A | * | 9/2007 |
| JP | 2007-316502 | A | | 12/2007 |

OTHER PUBLICATIONS

Japanese Office Action dated May 19, 2009 with English translation (Six (6) pages).

* cited by examiner

Primary Examiner—Lisa Lea-Edmonds
(74) Attorney, Agent, or Firm—Crowell & Moring LLP

(57) ABSTRACT

This thin liquid crystal television includes a thinly formed display portion displaying images and a stand member rotatably mounted on the back surface of the display portion and so formed as to support the display portion without bringing the lower surface of the display portion into contact with a receiving surface and to form a grip of the display portion by protruding upward beyond the display portion when rotated with respect to the display portion.

16 Claims, 8 Drawing Sheets

THIN DISPLAY

BACKGROUND OF THE INVENTION

1. Field of the Invention

The present invention relates to a thin display, and more particularly, it relates to a thin display comprising a stand member supporting a display portion.

2. Description of the Background Art

A thin display comprising a stand member supporting a display portion is known in general, as disclosed in each of Japanese Patent Laying-Open No. 2006-301211, Japanese Utility Model Laying-Open No. 4-44778 (1996), Japanese Patent Laying-Open No. 2004-336433 and Japanese Utility Model Laying-Open No. 63-153675 (1988), for example.

The aforementioned Japanese Patent Laying-Open No. 2006-301211 discloses a thin display comprising a display portion and a stand for supporting the display portion. In this thin display described in Japanese Patent Laying-Open No. 2006-301211, a first end of the stand is mounted on the center of the back surface of the display portion, while the display portion is supported in a state so inclined as to recline against the first end of the stand. The body of the display is held through the bottom surface of the display portion and a second end of the stand with respect to a receiving surface.

The aforementioned Japanese Utility Model Laying-Open No. 4-44778 discloses a handle-stand for a miniature liquid crystal television. In this handle-stand for a miniature liquid crystal television described in Japanese Utility Model Laying-Open No. 4-44778, both ends of a U-shaped handle are mounted on both side surfaces of the miniature liquid crystal television respectively. The bottom surface of the miniature liquid crystal television is so placed that the body of the miniature liquid crystal television is horizontally held, while the miniature liquid crystal television is supported in a state so inclined as to recline against the handle when the same is inclined.

The aforementioned Japanese Patent Laying-Open No. 2004-336433 discloses a thin video instrument comprising a cabinet including a cable cover serving as a lid member of a cable connecting terminal on the back surface thereof and a thinly formed display portion stored in the cabinet. In this thin video instrument described in Japanese Patent Laying-Open No. 2004-336433, a hinge is provided on a first side surface of the cable cover while a grip having a hole is provided on a second side surface thereof, and the grip of the cable cover rendered is usable as the grip of the instrumental body when the cable cover is opened. The cable cover is so sized as not to vertically or horizontally protrude from the display portion when the same is opened.

The aforementioned Japanese Utility Model Laying-Open No. 63-153675 discloses a portable television comprising a television body and a handle serving as a grip of the television body. In this portable television described in Japanese Utility Model Laying-Open No. 63-153675, the handle serving as the grip of the television body stores a speaker, while the television body is so formed that the overall bottom surface thereof is placed on a receiving surface.

In the thin display described in the aforementioned Japanese Patent Laying-Open No. 2006-301211, however, the display portion supported in the state so inclined as to recline against the stand cannot be held unless the same is regularly inclined by a prescribed angle. Therefore, the display portion cannot be held perpendicularly to the receiving surface.

In the handle-stand for a miniature liquid crystal television described in the aforementioned Japanese Utility Model Laying-Open No. 4-44778, the bottom surface of the miniature liquid crystal television (display portion) is so placed that the miniature liquid crystal television is horizontally held. If the display portion is thinly formed in this structure, therefore, the thin display portion cannot be held by simply placing the bottom surface thereof when arranged perpendicularly to a receiving surface. According to the aforementioned structure, therefore, the thin display portion cannot be held perpendicularly to the receiving surface.

In the thin video instrument described in the aforementioned Japanese Patent Laying-Open No. 2004-336433, the cable cover does not protrude from the display portion, and hence the instrument is not easy for the user to carry.

In the portable television described in the aforementioned Japanese Utility Model Laying-Open No. 63-153675, the television body is supported through the overall bottom surface. This document neither discloses nor suggests a structure for adjusting the angle of a thinly formed display portion, and is premised on a structure different from that of the present invention. Therefore, the portable television described in the aforementioned Japanese Utility Model Laying-Open No. 63-153675 does not even have such a problem to be solved by the present invention that it is difficult to adjust a display portion to an angle desired by the user, and lacks motivation for a means for solving this problem.

SUMMARY OF THE INVENTION

The present invention has been proposed in order to solve the aforementioned problems, and an object of the present invention is to provide a thin display capable of holding a display portion perpendicularly to a receiving surface and easy for the user to carry.

A thin display according to an aspect of the present invention comprises a thinly formed display portion displaying images and a stand member rotatably mounted on the back surface of the display portion and so formed as to support the display portion without bringing the lower surface of the display portion into contact with a receiving surface and to form a grip of the display portion by protruding upward beyond the display portion when rotated with respect to the display portion.

In the thin display according to this aspect of the present invention, as hereinabove described, the stand member is so formed as to rotatably support the display portion without bringing the lower surface of the display portion into contact with the receiving surface so that the stand member can support the overall display portion without bringing the lower surface thereof into contact with the receiving surface, whereby the display portion can be held perpendicularly to the receiving surface. Further, the stand member is so formed that a portion protruding upward beyond the display portion upon rotation forms the grip so that the user can carry the thin display by grasping the grip protruding upward beyond the display portion, whereby the user can easily carry the thin display by grasping the grip. In addition, the user can use the thin display in a state hung on the wall by engaging the grip protruding upward beyond the display portion with a protruding member such as a hook provided on the wall, for example.

In the thin display according to the aforementioned aspect, the stand member preferably includes a stand portion supporting the display portion and a coupling portion coupling the display portion and the stand portion with each other, the coupling portion preferably has a first end rotatably mounted on the display portion and a second end rotatably mounted on the stand portion, and the stand member is preferably rendered transformable into a first shape supporting the display portion coupled by the coupling portion with the stand portion and a second shape arranging the stand portion and the coupling portion along the back surface of the display portion. According to this structure, the coupling portion is rotatably mounted on the display portion and the stand portion respectively, whereby the stand member of the thin display can be easily transformed into the first shape or the second shape by rotating the stand portion with respect to the display portion through the coupling portion.

In this case, the stand portion is preferably rendered rotatable with respect to the coupling portion to be flush with the coupling portion, and the coupling portion and the stand portion are preferably mounted on the display portion in the state flush with each other in the second shape of the stand member. According to this structure, the coupling portion and the stand portion are flush with each other in the second shape of the stand member, whereby the anteroposterior width (thickness) of the overall thin display can be reduced in the second shape of the stand member.

In the aforementioned structure having the stand portion and the coupling portion arrangeable to be flush with each other, the widths of the display portion and the stand portion along a direction from the front surface toward the back surface of the display portion in the second shape of the stand member are preferably smaller than the width of the stand portion along the direction from the front surface toward the back surface of the display portion in the first shape of the stand member. According to this structure, the user can more easily carry the thin display in the second shape of the stand member with the stand portion functioning as the grip of the display portion as compared with the first shape with the stand portion supporting the display portion due to the width reduced along the direction from the front surface toward the back surface of the display portion.

In the aforementioned structure of the thin display having the stand member transformable into the first shape or the second shape, the display portion preferably includes a first engaging portion on the back surface thereof, the coupling portion preferably includes a second engaging portion corresponding to the first engaging portion of the display portion, and the stand member is preferably so formed as to be fixed to the back surface of the display portion through engagement between the first engaging portion of the display portion and the second engaging portion of the coupling portion when arranged along the back surface of the display portion due to transformation into the second shape. According to this structure, the stand member can be easily fixed to the back surface of the display portion by engaging the first and second engaging portions with each other when the stand member is employed as the grip, whereby the grip can be inhibited from positional fluctuation with respect to the display portion when the user carries the thin display by grasping the grip. Thus, the user can more easily carry the thin display.

In this case, the first engaging portion preferably includes a protrusion so formed as to horizontally protrude from the back surface of the display portion while the second engaging portion preferably includes a recess portion rendered engageable with the protrusion of the first engaging portion. According to this structure, the first and second engaging portions can be easily engaged with each other by engaging the recess portion of the second engaging portion with the protrusion of the first engaging portion.

In the aforementioned structure having the first engaging portion including the protrusion, the protrusion of the first engaging portion preferably includes a hook rendered engageable with the recess portion of the second engaging portion. According to this structure, the first and second engaging portions can be reliably engaged with each other by engaging the hook of the first engaging portion with the recess portion of the second engaging portion.

In the aforementioned structure of the thin display having the stand member transformable into the first shape or the second shape, the stand portion is preferably annularly formed in plan view in the first shape of the stand member. According to this structure, part of the annular stand portion protruding upward beyond the display portion functions as the grip when the stand member of the thin display is transformed into the second shape, whereby the user can more easily carry the thin display.

In this case, the stand portion is preferably elliptically formed in plan view in the first shape of the stand member. According to this structure, the stand portion can stably support the display portion in the first shape of the stand member.

In the aforementioned structure of the thin display having the stand member transformable into the first shape or the second shape, the stand member preferably has a plurality of rubber members arranged on a surface coming into contact with the receiving surface in the first shape. According to this structure, the rubber members can inhibit the stand portion from slipping when the stand portion supports the display portion in the first shape of the stand member.

In the aforementioned structure of the thin display having the stand member transformable into the first shape or the second shape, the stand portion is preferably so formed as to protrude from the front surface and the back surface of the display portion respectively in plan view in the first shape of the stand member. According to this structure, the stand portion is so sized as to protrude from both of the front and back surfaces of the display portion, thereby stably supporting the display portion.

In this case, the length of the stand portion protruding from the back surface of the display portion is preferably larger than the length of the stand portion protruding from the front surface of the display portion in plan view in the first shape of the stand member. According to this structure, the stand portion so supports the back surface of the display portion through the coupling portion that the display portion is easily inclinable toward the front side while the stand portion more protrudes from the front surface than from the back surface of the display portion thereby more stably supporting the display portion.

In the aforementioned structure of the thin display having the stand member transformable into the first shape or the second shape, the coupling portion is preferably so formed as to protrude downward beyond the lower surface of the display portion and to be substantially perpendicular to the stand portion in the first shape of the stand member. According to this structure, the coupling portion so protrudes downward beyond the lower surface of the display portion that the same can reliably support the display portion without bringing the lower surface thereof into contact with the receiving surface. At this time, the stand portion supports the coupling portion supporting the display portion to be substantially perpendicular to the stand portion, whereby the display portion and the coupling portion can be more stably supported.

In this case, the stand portion is preferably so formed as to protrude frontward and backward from the display portion with respect to the coupling portion in the first shape of the stand member. According to this structure, the stand portion can support the display portion and the coupling portion not only with the part protruding frontward with respect to the coupling portion but also with the part protruding backward with respect to the coupling portion.

In the aforementioned structure having the coupling portion rendered substantially perpendicular to the stand portion, the display portion is preferably substantially vertically supported with respect to the stand portion in the first shape of the stand member. According to this structure, the display portion can be substantially vertically held with respect to the receiving surface of the stand portion in the first shape of the stand member.

In the aforementioned structure of the thin display having the stand member transformable into the first shape or the second shape, the first end of the coupling portion is preferably mounted on the back surface of the display portion, and the coupling portion is preferably rendered rotatable substantially by 180° around the first end of the coupling portion to be directed upward from below with respect to the back surface of the display portion when the stand member is transformed from the first shape into the second shape. According to this structure, the coupling portion is rotatable substantially by 180° with respect to the display portion so that the same can reliably support the display portion in the first shape of the stand member and can be fixed along the display portion in the second shape of the stand member, whereby the width of the overall thin display is so reduced that the user can easily carry the same.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention is now described with reference to the drawings.

First, the structure of a thin liquid crystal television 1 according to the embodiment of the present invention is described with reference to FIGS. 1 to 13. According to this embodiment, the present invention is applied to the thin liquid crystal television 1 employed as an exemplary thin display.

Figure 1:
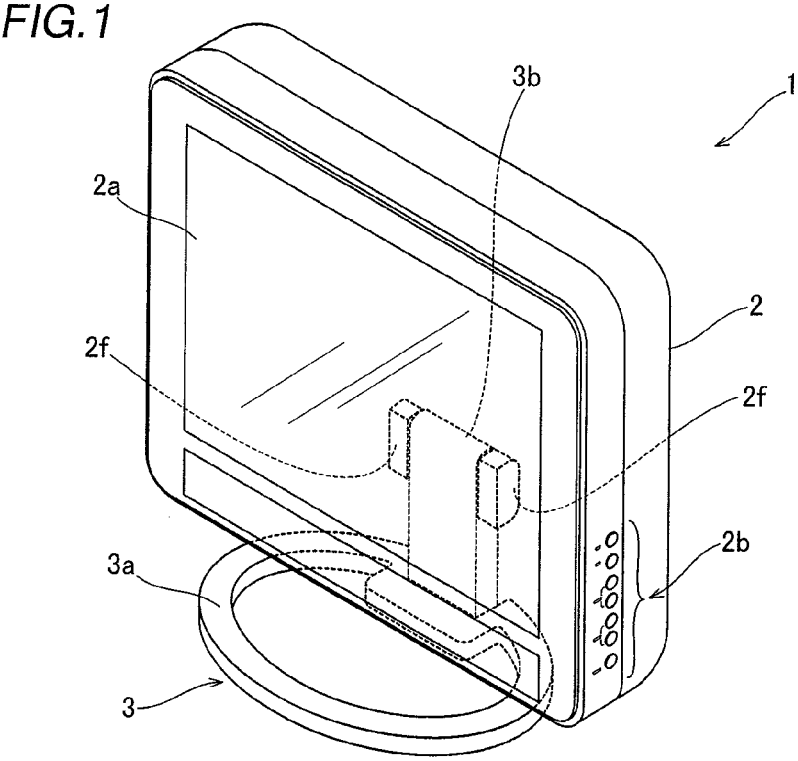
FIG. 1 is a perspective view showing the overall structure of a thin liquid crystal television according to an embodiment of the present invention.
Figure 2:
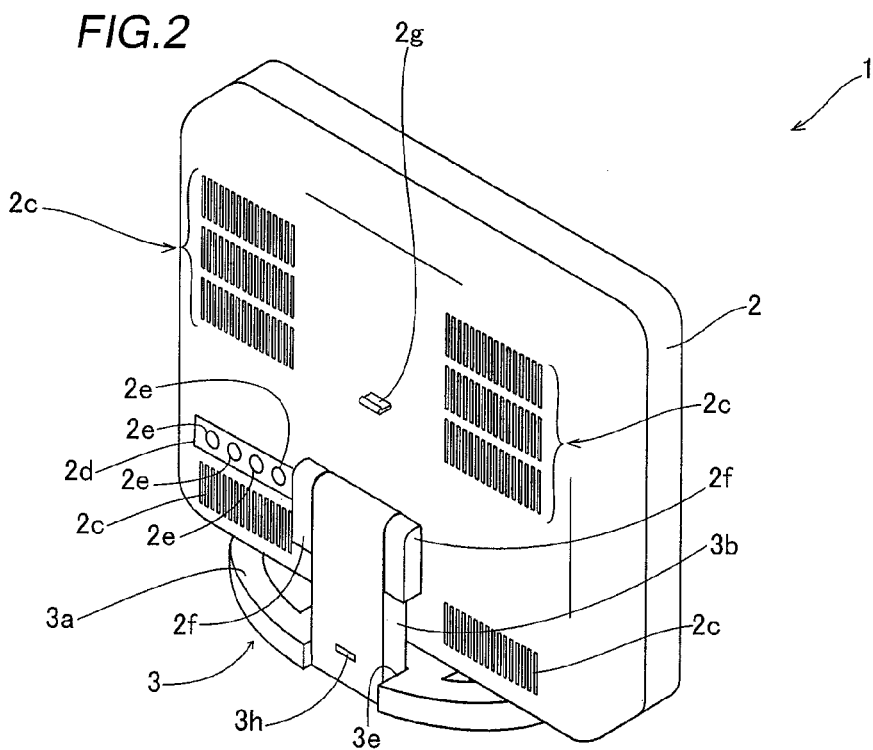
FIG. 2 is another perspective view showing the overall structure of the thin liquid crystal television according to the embodiment of the present invention shown in FIG. 1.
Figure 3:
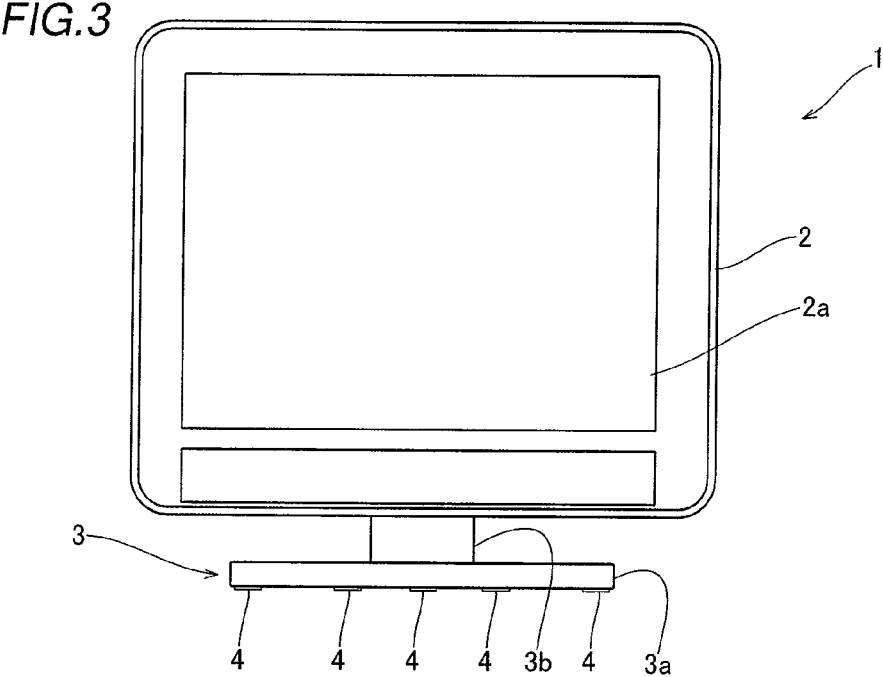
FIG. 3 is a front elevational view of the thin liquid crystal television according to the embodiment of the present invention shown in FIG. 1.
Figure 4:
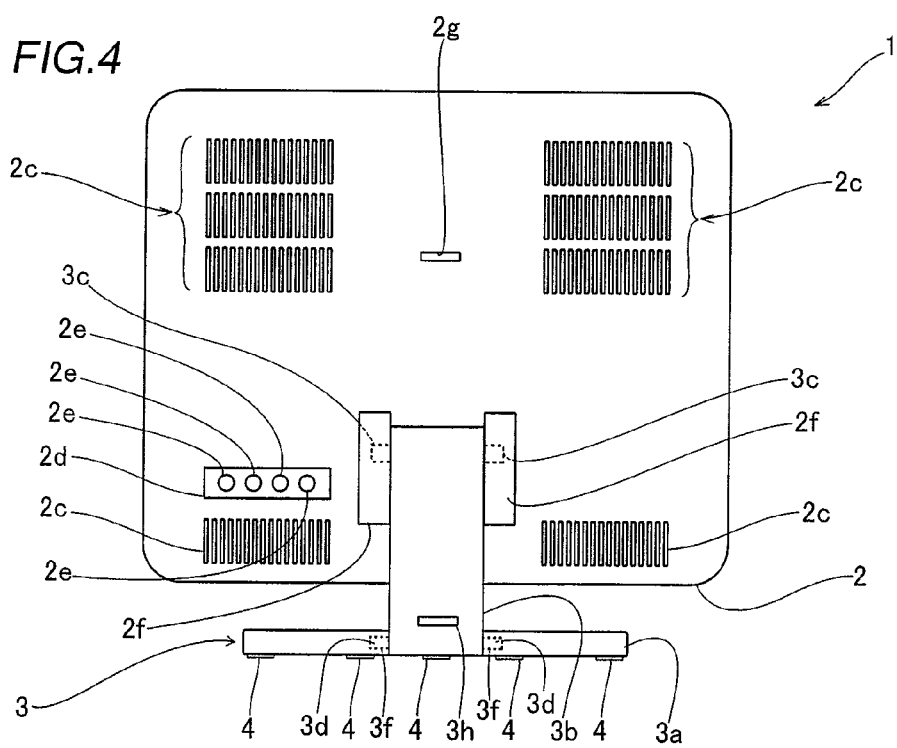
FIG. 4 is a rear elevational view of the thin liquid crystal television according to the embodiment of the present invention shown in FIG. 1.

The thin liquid crystal television 1 according to the embodiment of the present invention comprises a display portion 2 outputting images and a stand member 3 supporting the display portion 2, as shown in FIGS. 1 to 4. The display portion 2 includes a monitor 2a formed by an LCD (liquid crystal display) on the front side thereof while including a button portion 2b formed by selection buttons for selecting channels of television broadcasts etc. and a power button for the thin liquid crystal television 1 on a first side surface thereof, as shown in FIGS. 1 and 3. The display portion 2 includes a plurality of radiating holes 2c and an external input substrate 2d having a plurality of terminals 2e for connecting the thin liquid crystal television 1 with external apparatuses such as a DVD player on the back side thereof, as shown in FIGS. 2 and 4.

Figure 5:
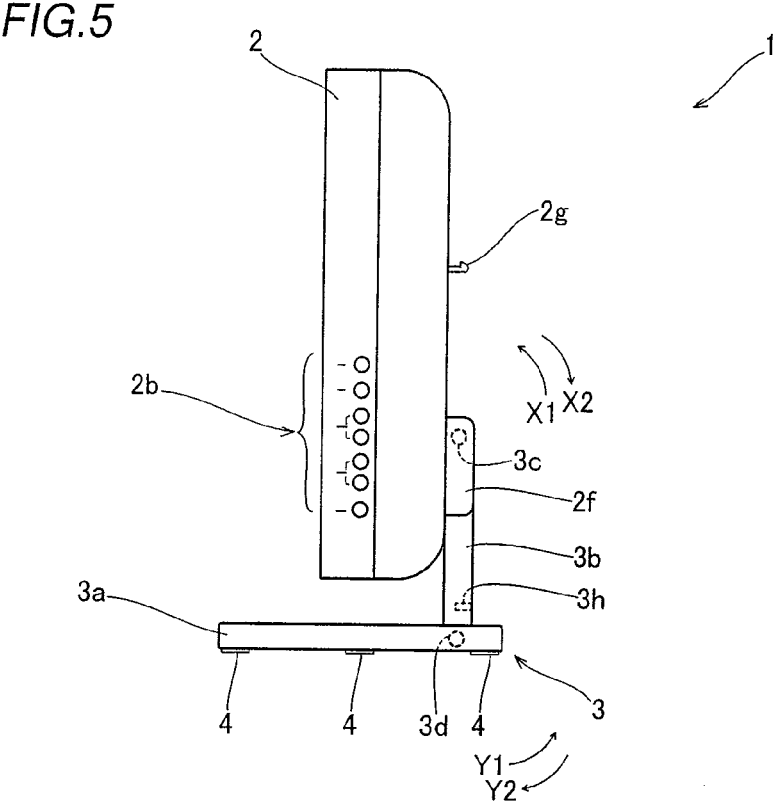
FIG. 5 is a side elevational view of the thin liquid crystal television according to the embodiment of the present invention shown in FIG. 1.

According to this embodiment, the stand member 3 is constituted of a stand portion 3a supporting the display portion 2 and a coupling portion 3b coupling the display portion 2 and the stand portion 3a with each other, as shown in FIGS. 1 and 2. The stand member 3 is rotatably mounted on the back surface of the display portion 2 and supports the display portion 2 without bringing the lower surface of the display portion 2 into contact with a receiving surface, as shown in FIGS. 4 and 5. More specifically, protruding first rotating shaft portions 3c are formed on both side surfaces of a first end of the coupling portion 3b respectively, while two bearing members 2f corresponding to the first rotating shaft portions 3c respectively are provided on the back surface of the display portion 2. The stand member 3 is so formed as to support the overall display portion 2 by fitting the first rotating shaft portions 3c of the coupling portion 3b into the bearing members 2f provided on the back surface of the display portion 2. The coupling portion 3b of the stand member 3 is rendered rotatable around the rotating shaft portions 3c fitted into the bearing members 2f of the display portion substantially by 180° along arrows X1 and X2 shown in FIG. 5 with respect to the display portion 2.

According to this embodiment, the stand portion 3a is so formed as to protrude from the front and back surfaces of the display portion 2 respectively in plan view, as shown in FIGS.

Figure 6:
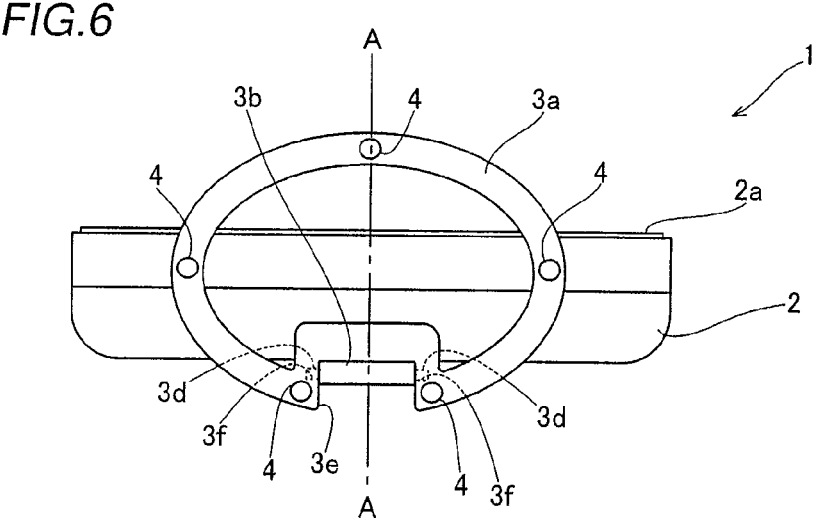
FIG. 6 is a plan view of the thin liquid crystal television according to the embodiment of the present invention shown in FIG. 1 as viewed from below.
Figure 7:
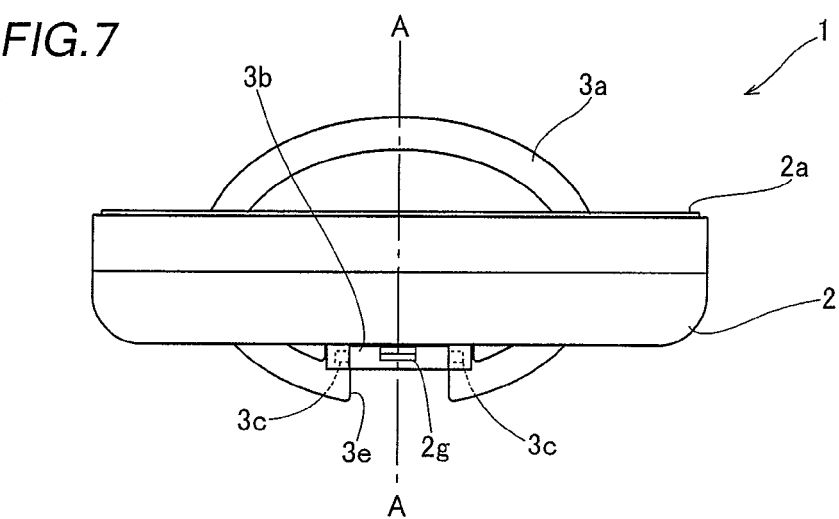
FIG. 7 is a plan view of the thin liquid crystal television according to the embodiment of the present invention shown in FIG. 1.
Figure 8:
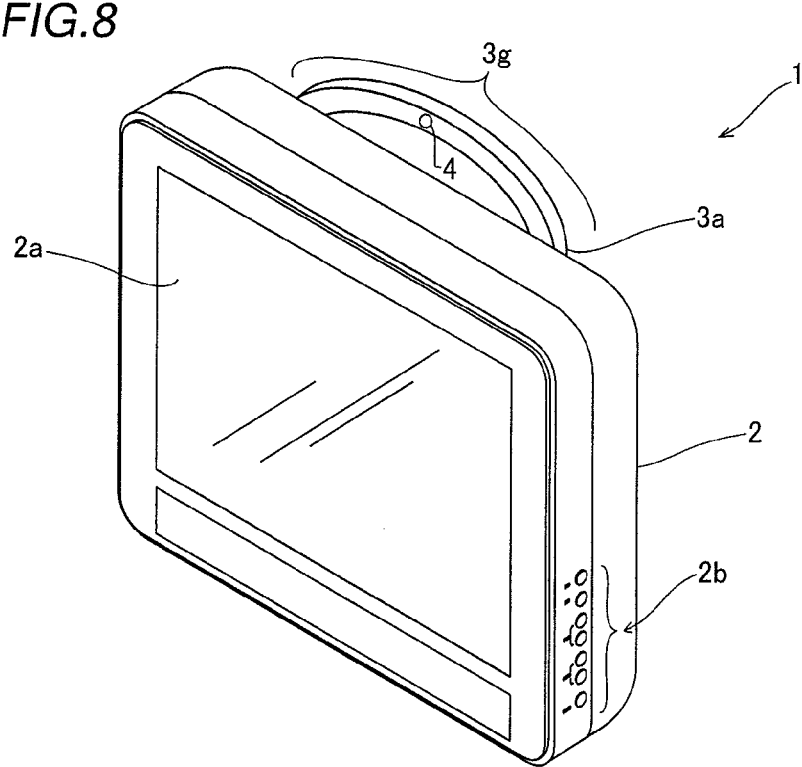
FIG. 8 is a perspective view showing the thin liquid crystal television according to the embodiment of the present invention shown in FIG. 1 in a state where a stand member is transformed into a second shape.
Figure 9:
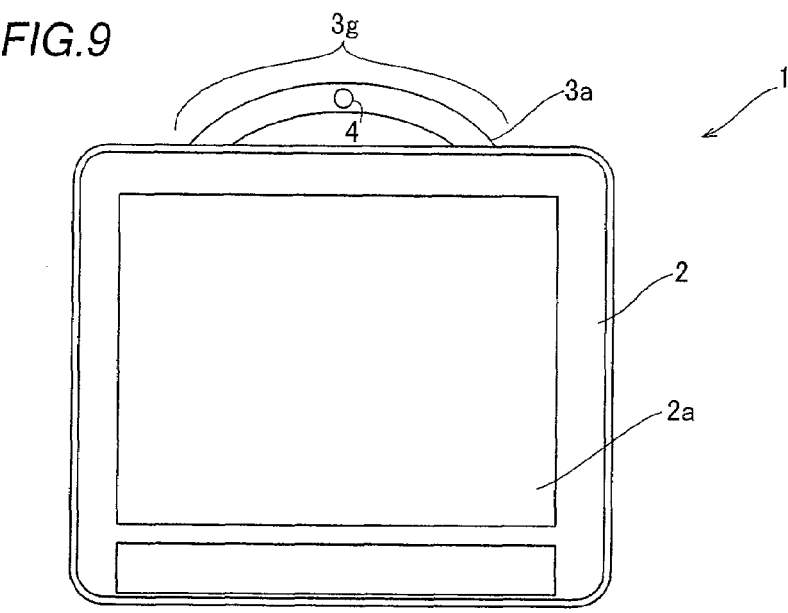
FIG. 9 is a front elevational view showing the thin liquid crystal television according to the embodiment of the present invention shown in FIG. 1 in the state where the stand member is transformed into the second shape.
Figure 10:
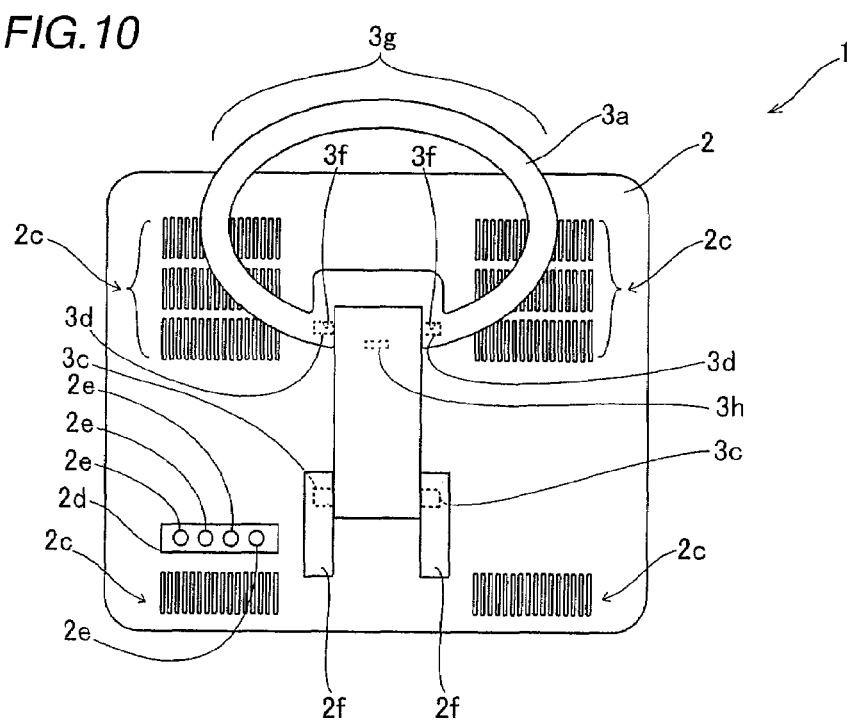
FIG. 10 is a rear elevational view showing the thin liquid crystal television according to the embodiment of the present invention shown in FIG. 1 in the state where the stand member is transformed into the second shape.

6 and 7. Further, the stand portion 3a is annularly and elliptically formed in plan view, and a recess portion 3e having a size capable of receiving a second end of the coupling portion 3b is formed on a first portion located on the minor axis (segment A-A in FIG. 6) of the ellipse. As shown in FIGS. 4 to 6, further, protruding second rotating shaft portions 3d are formed on both side surfaces of the second end of the coupling portion 3b respectively so that the second rotating shaft portions 3d of the coupling portion 3b are fitted into bearing portions 3f formed on the inner side surface of the recess portion 3e when the coupling portion 3b is arranged in the recess portion 3e of the stand portion 3a, thereby rotatably coupling the stand portion 3a and the second end of the coupling portion 3b with each other. The stand portion 3a coupled to the coupling portion 3b is rendered rotatable around the second rotating shaft portions 3d of the coupling portion 3b substantially by 90° along arrows Y1 and Y2 in FIG. 5.

A plurality of (five in this embodiment) circular rubber members 4 are provided on the lower surface of the stand portion 3a as antislip members, as shown in FIG. 6.

Figure 11:
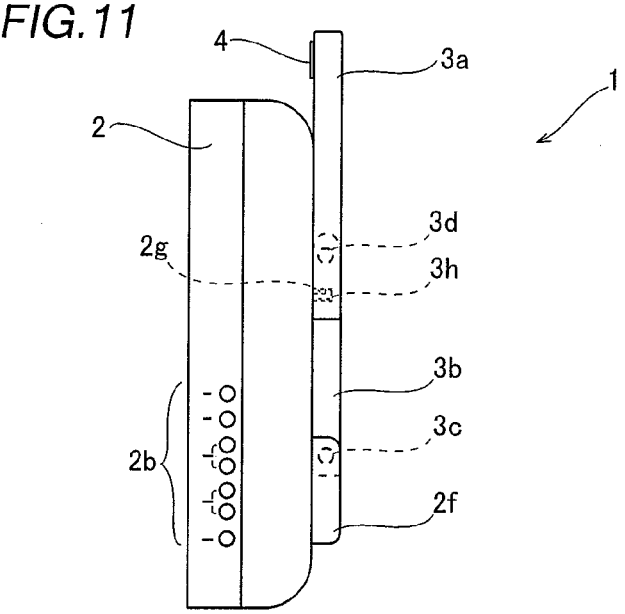
FIG. 11 is a side elevational view showing the thin liquid crystal television according to the embodiment of the present invention shown in FIG. 1 in the state where the stand member is transformed into the second shape.
Figure 12:
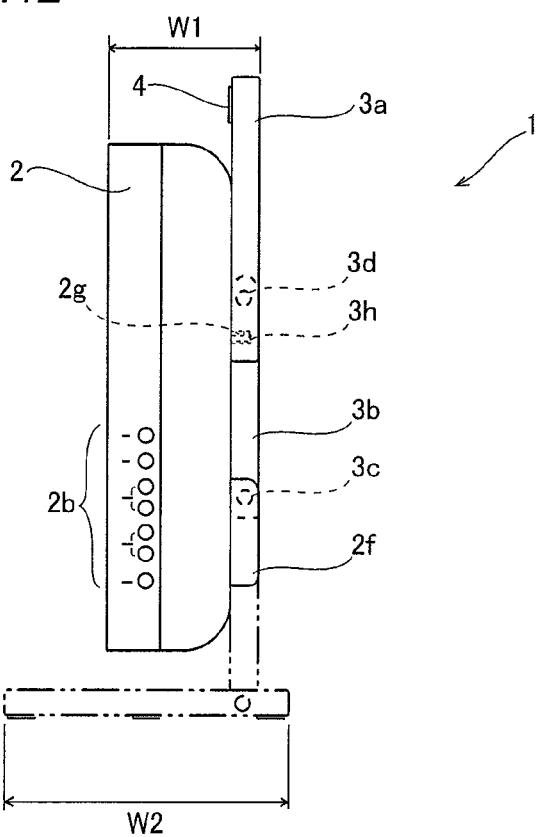
FIG. 12 is a side elevational view for illustrating structural difference between a first shape and the second shape of the stand member of the thin liquid crystal television according to the embodiment of the present invention shown in FIG. 1.

According to this embodiment, the stand member 3 is rendered transformable into a first shape supporting the display portion 2 coupled by the coupling portion 3b with the stand portion 3a as shown in FIGS. 1 to 4 and a second shape arranging the stand portion 3a and the coupling portion 3b along the back surface of the display portion 2 in a state flush with each other as shown in FIGS. 8 to 11. The stand member 3 is so formed that the stand portion 3a partially protrudes upward beyond the display portion 2 to form a grip 3g of the display portion 2 in the second shape (shown in FIGS. 8 to 11). As shown in FIG. 12, the width W1 of the thin liquid crystal television 1 in the second shape (shown in FIG. 8) of the stand member 3 is smaller than the width W2 in the first shape (shown in FIG. 1) of the stand member 3. Thus, the user can easily pack the thin liquid crystal television 1 by transforming the stand member 3 into the second shape. The transformation of the stand member 3 from the first shape into the second shape is described later in detail.

Figure 13:
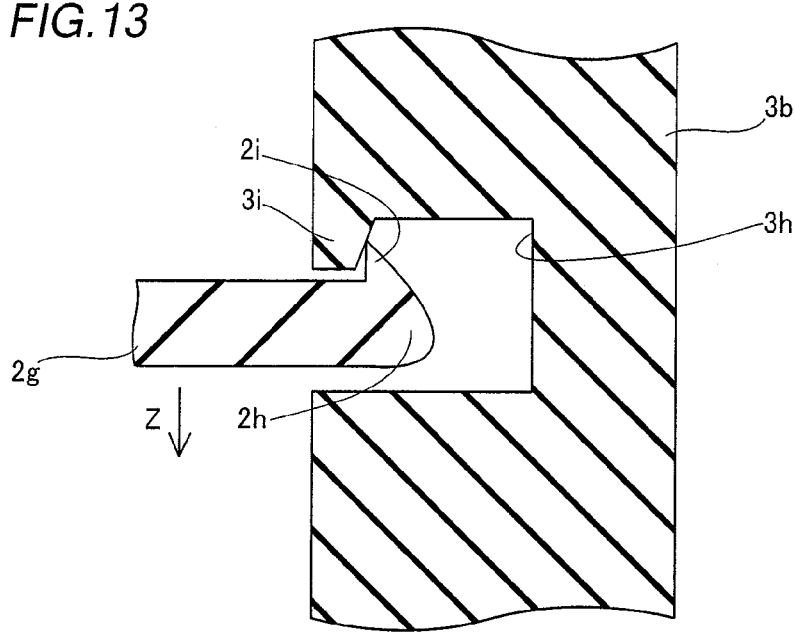
FIG. 13 is an enlarged sectional view for illustrating an engaging state between first and second engaging portions of the thin liquid crystal television according to the embodiment of the present invention shown in FIG. 1.

According to this embodiment, the display portion 2 is provided with a hook 2g horizontally protruding from the back surface while the coupling portion 3b is provided with a recess portion 3h engaging with the hook 2g of the display portion 2, as shown in FIG. 2. The hook 2g and the recess portion 3h are examples of the "first engaging portion" and the "second engaging portion" respectively. When the stand member 3 is arranged along the back surface of the display portion 2 in the second shape (shown in FIGS. 8 to 11), the hook 2g of the display portion 2 and the recess portion 3h of the coupling portion 3b so engage with each other as to fix the stand member 2 to the back surface of the display portion 2, as shown in FIG. 11. As shown in FIG. 13, a protrusion 2h of the hook 2g provided on the display portion 2 is so inclined that the lower side surface of the hook 2g and the surface opposed to the recess portion 3h form a sharp angle, while an engaging pawl 2i is formed on the upper surface of the protrusion 2h. The recess portion 3h formed on the coupling portion 3b is provided with a protruding stop portion 3i for inhibiting the engaging pawl 2i of the hook 2g from disengagement, and the engaging pawl 2i and the stop portion 3i so engage with each other as to fix the stand member 3 to the display portion 2. The hook 2g is rendered deflectable downward (along arrow Z in FIG. 13). The stop portion 3i is so inclined that the thickness thereof is reduced downward on the surface opposed to the engaging pawl 2i. Thus, when the hook 2g is deflected downward (along arrow Z) in order to release the stand member 3 from the fixation to the display portion 2, the engaging pawl 2i of the hook 2g is slidable along the inclined surface of the stop portion 3i.

The transformation of the stand member 3 of the thin liquid crystal television 1 according to the embodiment of the present invention is now described with reference to FIGS. 1, 5, 8, 11 and 13 to 15.

Figure 14:
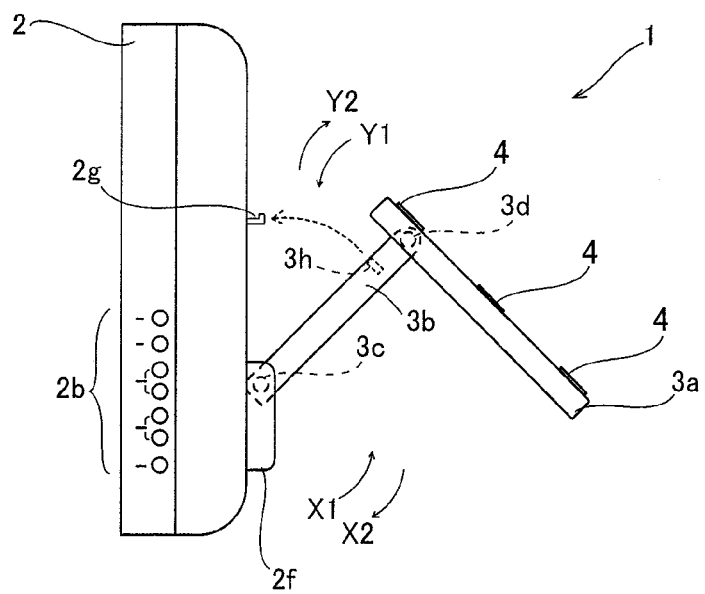
FIGS. 14 and 15 are side elevational views for illustrating transformation of the stand member of the thin liquid crystal television according to the embodiment of the present invention shown in FIG. 1 from the first shape into the second shape.

In the first shape of the stand member 3 supporting the display portion 2 as shown in FIG. 5, the stand member 3 is rotated along arrow X1 with respect to the display portion 2, so that the thin liquid crystal television 1 is transformed into the state shown in FIG. 14. Then, the stand portion 3a is rotated along arrow Y1 from the state shown in FIG. 14, so that the thin liquid crystal television 1 is transformed into the state shown in FIG. 15. At this time, the stand portion 3a and the coupling portion 3b are flush with each other. The stand portion 3a and the coupling portion 3b flush with each other are rotated along arrow X1 from the state shown in FIG. 15, so that the thin liquid crystal television 1 is transformed into the state shown in FIG. 11. At this time, the engaging pawl 2i of the hook 2g of the display portion 2 and the stop portion 3i of the recess portion 3h of the coupling portion 3b of the stand member 3 engage with each other to fix the stand member 3 to the display portion 2, whereby the transformation of the stand member 3 of the thin liquid crystal television 1 from the first shape (shown in FIG. 1) to the second shape (shown in FIG. 8) is completed.

Figure 15:
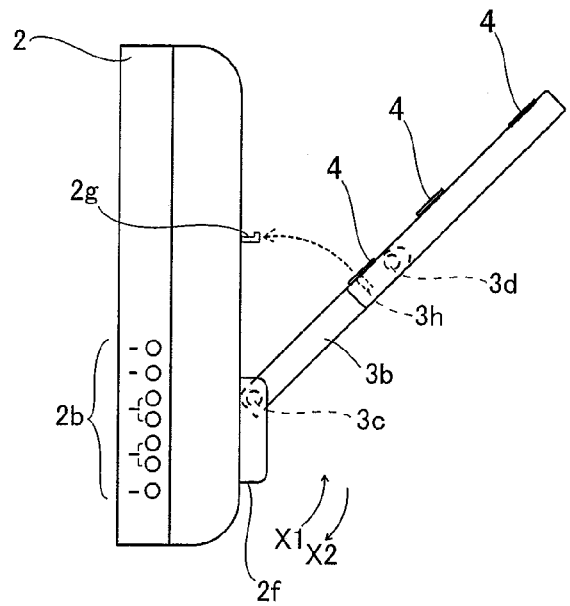

On the other hand, the stand member 3 of the thin liquid crystal television 1 is reversely transformed from the second shape into the first shape by reversely repeating the aforementioned procedure. In other words, the hook 2g is deflected downward (along arrow Z in FIG. 13) from the state where the engaging pawl 2i and the stop portion 3i engage with each other as shown in FIGS. 11 and 13, thereby sliding the engaging pawl 2i along arrow Z along the inclined surface of the stop portion 3i. Thus, the hook 2g and the recess portion 3h are disengaged from each other, thereby releasing the stand member 3 from the fixation to the display portion 2. Then, the stand member 3 is rotated along arrow X2 as shown in FIG. 15, and the stand portion 3a and the stand member 3 are thereafter rotated along arrows Y2 and X2 respectively as shown in FIG. 14, whereby the stand member 3 of the thin liquid crystal television 1 is completely transformed into the first shape shown in FIG. 5.

Figure 16:
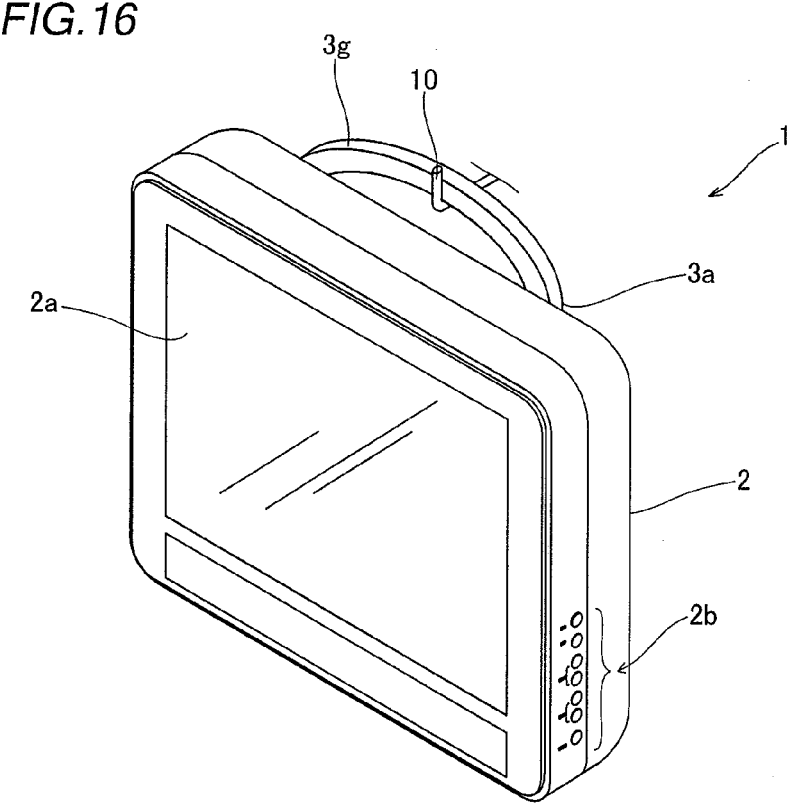
FIG. 16 is a perspective view for illustrating effects of the thin liquid crystal television according to the embodiment of the present invention shown in FIG. 1.

According to this embodiment, as hereinabove described, the stand member 3 is so formed as to rotatably support the display portion 2 without bringing the lower surface thereof into contact with the receiving surface to be capable of supporting the overall display portion 2 without bringing the lower surface of the display portion 2 into contact with the receiving surface, whereby the display portion 2 can be perpendicularly held with respect to the receiving surface. Further, the stand member 3 is so formed that the part protruding upward beyond the display portion 2 upon rotation forms the grip 3g so that the user can carry the thin liquid crystal television 1 by grasping the grip 3g protruding upward beyond the display portion 2, whereby the user can easily carry the thin liquid crystal television 1 by grasping the grip 3g. In addition, the user can use the thin liquid crystal television 1 in a state hung on the wall by engaging the grip 3g protruding upward beyond the display portion 2 with a protruding member such as a hook 10 provided on the wall as shown in FIG. 16, for example.

According to this embodiment, as hereinabove described, the stand member 3 is so formed as to include the stand portion 3a supporting the display portion 2 and the coupling portion 3b coupling the display portion 2 and the stand portion 3a with each other while the coupling portion 3b is so formed that the first and second ends thereof are rotatably mounted on the display portion 2 and the stand portion 3a respectively and the stand member 3 is rendered transformable into the first shape supporting the display portion 2 coupled by the coupling portion 3b with the stand portion 3a and the second shape arranging the stand portion 3a and the coupling portion 3b along the back surface of the display portion 2 so that the coupling portion 3b is rotatably mounted on the display portion 2 and the stand portion 3a respectively, whereby the stand member 3 of the thin liquid crystal television 1 can be easily transformed into the first shape or the second shape by rotating the stand member 3a with respect to the display portion 2 through the coupling portion 3b.

According to this embodiment, as hereinabove described, the stand portion 3a is rendered rotatable with respect to the coupling portion 3b to be flush with the coupling portion 3b while the stand portion 3a and the coupling portion 3b are mounted on the display portion 2 in the state flush with each other in the second shape of the stand member 3, whereby the width of the overall thin liquid crystal television 1 can be reduced when the stand member 3 is in the second shape due to the stand portion 3a and the coupling portion 3b flush with each other.

According to this embodiment, as hereinabove described, the width of the overall thin liquid crystal television 1 along the direction from the front surface toward the back surface of the display portion 2 in the second shape of the stand member 3 is smaller than the width of the stand porti/on 3a along the direction from the front surface toward the back surface of the display portion 2 in the first shape of the stand member 3, whereby the user can more easily carry the thin liquid crystal television 1 in the second shape of the stand member 3 functioning as the grip 3g of the display portion 2 as compared with the first shape of the stand member 3 supporting the display portion 2 due to the small width along the direction from the front surface toward the back surface of the display portion 2.

According to this embodiment, as hereinabove described, the display portion 2 is so formed as to include the hook 2g on the back surface thereof and the coupling portion 3b is so formed as to include the recess portion 3h corresponding to the hook 2g of the display portion 2 while the stand member 3 is fixed to the back surface of the display portion 2 due to the engagement between the hook 2g of the display portion 2 and the recess portion 3h of the coupling portion 3b when arranged along the back surface of the display portion 2 in the second shape so that the stand member 3 can be easily fixed to the back surface of the display portion 3 when employed as the grip 3g due to the engagement between the hook 2g and the recess portion 3h, whereby the grip 3g can be inhibited from positional fluctuation with respect to the display portion 2 when the user carries the thin liquid crystal television 1 by grasping the grip 3g. Thus, the user can more easily carry the thin liquid crystal television 1.

According to this embodiment, as hereinabove described, the hook 2g includes the protrusion 2h horizontally protruding from the back surface of the display portion 2 while the recess portion 3h is rendered engageable with the protrusion 2h of the hook 2g, whereby the hook 2g and the recess portion 3h can be easily engaged with each other by engaging the recess portion 3h with the protrusion 2h of the hook 2g.

According to this embodiment, as hereinabove described, the stand portion 3a is so annularly formed in plan view when the stand member 3 is in the first shape that part of the annular stand portion 3a protruding upward beyond the display portion 2 functions as the grip 3g when the stand member 3 of the thin liquid crystal television 1 is transformed into the second shape, whereby the user can more easily carry the thin liquid crystal television 1.

According to this embodiment, as hereinabove described, the stand portion 3a is so elliptically formed in plan view when the stand member 3 is in the first shape that the stand portion 3a can stably support the display portion 2.

According to this embodiment, as hereinabove described, the stand member 3 is so formed that the part of the stand portion 3a along the major axis direction of the ellipse protrudes upward beyond the display portion 2 in the second shape so that the protruding area of the stand portion 3a is increased as compared with a case where another part of the stand portion 3a along the minor axis direction of the ellipse protrudes beyond the display portion 2, whereby the area functioning as the grip 3g in the second shape of the stand member 3 can be increased. Thus, the user can more easily carry the thin liquid crystal television 1.

According to this embodiment, as hereinabove described, the stand member 3 is so formed as to have the plurality of rubber members 4 arranged on the surface coming into contact with the receiving surface in the first shape, whereby the rubber members 4 can inhibit the stand member 3 from slipping when supporting the display portion 2 in the first shape.

According to this embodiment, as hereinabove described, the stand portion 3a is so formed as to protrude from the front and back surfaces of the display portion 2 respectively in plan view to be so sized as to protrude from both of the front and back surfaces of the display portion 2, whereby the display portion 2 can be stably supported.

According to this embodiment, as hereinabove described, the stand portion 3a is so formed that the length protruding from the front surface of the display portion 2 is larger than the length protruding from the back surface of the display portion 2 in plan view in the first shape of the stand member 3 so that the display portion 2 is easily inclinable toward the front side due to the stand portion 3a supporting the back surface of the display portion 2 through the coupling portion 3b while the stand portion 3a more protrudes from the front surface than from the back surface of the display portion 2, whereby the display portion 2 can be more stably supported.

According to this embodiment, as hereinabove described, the first end of the coupling portion 3b is mounted on the back surface of the display portion 2 and the coupling portion 3b is rendered rotatable around the first end substantially by 180° upward from below with respect to the back surface of the display portion 2 when the stand member 3 is transformed from the first shape into the second shape so that the coupling portion 3b is rotatable substantially by 180° with respect to the display portion 2, whereby the coupling portion 3b can support the display portion 2 in the first shape of the stand member 3 and can be fixed along the display portion 2 in the second shape of the stand member 3.

According to this embodiment, as hereinabove described, the coupling portion 3b is so formed as to protrude downward beyond the lower surface of the display portion 2 and to be substantially perpendicular to the stand portion 3a in the first shape of the stand member 3, whereby the coupling portion 3b protruding downward beyond the lower surface of the display portion 2 can reliably support the display portion 2 without bringing the lower surface thereof into contact with the receiving surface. At this time, the stand portion 3b supports the coupling portion 3b supporting the display portion 2 to be substantially perpendicular thereto, whereby the stand portion 3a can more stably support the display portion 2 and the coupling portion 3b.

According to this embodiment, as hereinabove described, the stand portion 3a is so formed as to protrude from the front and back surfaces of the display portion 2 respectively with respect to the coupling portion 3b in the first shape of the stand member 3, whereby the stand portion 3a can support the display portion 2 and the coupling portion 3b not only with the part protruding frontward with respect to the coupling portion 3b but also with the part protruding backward with respect to the coupling portion 3b.

According to this embodiment, as hereinabove described, the display portion 2 is rendered substantially perpendicularly supported with respect to the stand portion 3a in the first shape of the stand member 3, whereby the display portion 2 can be perpendicularly held with respect to the receiving surface of the stand portion 3a in the first shape of the stand member 3.

Although the present invention has been described and illustrated in detail, it is clearly understood that the same is by way of illustration and example only and is not to be taken by way of limitation, the spirit and scope of the present invention being limited only by the terms of the appended claims.

For example, while this embodiment is applied to the thin liquid crystal television employed as an exemplary thin display, the present invention is not restricted to this but is also applicable to another display other than the thin liquid crystal television so far as the display comprises a thin display portion.

While the protruding first engaging portion (hook) is formed on the back surface of the display portion and the concave second engaging portion (recess portion) is formed on the coupling portion of the stand member in this embodiment, the present invention is not restricted to this but the first engaging portion of the display portion may alternatively be concavely formed, and the second engaging portion of the coupling portion may alternatively be protrusively formed.

While the stand member is fixed to the display portion through the single engagement between the first engaging portion (hook) of the display portion and the second engaging portion (recess portion) of the coupling portion in this embodiment, the present invention is not restricted to this but a plurality of engaging portions may alternatively be so provided as to fix the stand member to the display portion by engagement on a plurality of portions.

While the stand portion is formed in a ring-shaped (annular) manner in plan view in this embodiment, the present invention is not restricted to this but the stand portion may alternatively have a shape such as a discoidal shape, for example, other than the ring shape. In this case, a hole or the like for forming a carrying handle is preferably provided on the part of the stand portion protruding upward beyond the display portion in the second shape of the stand member.

While the stand portion is elliptically shaped in plan view in this embodiment, the present invention is not restricted to this but the stand portion may alternatively have a shape such as a rectangular shape, for example, other than the elliptic shape.

What is claimed is:

1. A thin display comprising:
    a thinly formed display portion displaying images; and
    a stand member including a stand portion coming into contact with a receiving surface in a state placed on said receiving surface and supporting said display portion, wherein
    said stand member is rotatably mounted on the back surface of said display portion and so formed as to support said display portion without bringing the lower surface of said display portion into contact with said receiving surface, and said stand portion of said stand member forms a grip of said display portion by protruding upward beyond said display portion when said stand member is rotated with respect to said display portion.

2. The thin display according to claim 1, wherein
    said stand member further includes a coupling portion coupling said display portion and said stand portion with each other,
    said coupling portion has a first end rotatably mounted on said display portion and a second end rotatably mounted on said stand portion, and
    said stand member is rendered transformable into a first shape supporting said display portion coupled by said coupling portion with said stand portion and a second shape arranging said stand portion and said coupling portion along the back surface of said display portion.

3. The thin display according to claim 2, wherein
    said stand portion is rendered rotatable with respect to said coupling portion to be flush with said coupling portion, and said coupling portion and said stand portion are mounted on said display portion in the state flush with each other in said second shape of said stand member.

4. The thin display according to claim 3, wherein
    the widths of said display portion and said stand portion along a direction from the front surface toward the back surface of said display portion in said second shape of said stand member are smaller than the width of said stand portion along said direction from the front surface toward the back surface of said display portion in said first shape of said stand member.

5. The thin display according to claim 2, wherein
    said display portion includes a first engaging portion on the back surface thereof,
    said coupling portion includes a second engaging portion corresponding to said first engaging portion of said display portion, and
    said stand member is so formed as to be fixed to the back surface of said display portion through engagement between said first engaging portion of said display portion and said second engaging portion of said coupling portion when arranged along the back surface of said display portion due to transformation into said second shape.

6. The thin display according to claim 5, wherein
    said first engaging portion includes a protrusion so formed as to horizontally protrude from the back surface of said display portion while said second engaging portion includes a recess portion rendered engageable with said protrusion of said first engaging portion.

7. The thin display according to claim 6, wherein
    said protrusion of said first engaging portion includes a hook rendered engageable with said recess portion of said second engaging portion.

8. The thin display according to claim 2, wherein
    said stand portion is annularly formed in plan view in said first shape of said stand member.

9. The thin display according to claim 8, wherein
    said stand portion is elliptically formed in plan view in said first shape of said stand member.

10. The thin display according to claim 2, wherein
    said stand member has a plurality of rubber members arranged on a surface coming into contact with said receiving surface in said first shape.

11. The thin display according to claim 2, wherein
    said stand portion is so formed as to protrude from the front surface and the back surface of said display portion in plan view in said first shape of said stand member.

12. The thin display according to claim 11, wherein
the length of said stand portion protruding from the back surface of said display portion is larger than the length of said stand portion protruding from the front surface of said display portion in plan view in said first shape of said stand member.

13. The thin display according to claim 2, wherein
said coupling portion is so formed as to protrude downward beyond the lower surface of said display portion and to be substantially perpendicular to said stand portion in said first shape of said stand member.

14. The thin display according to claim 13, wherein
said stand portion is so formed as to protrude frontward and backward from said display portion with respect to said coupling portion in said first shape of said stand member.

15. The thin display according to claim 13, wherein
said display portion is substantially vertically supported with respect to said stand portion in said first shape of said stand member.

16. The thin display according to claim 2, wherein
said first end of said coupling portion is mounted on the back surface of said display portion, and said coupling portion is rendered rotatable substantially by 180° around said first end of said coupling portion to be directed upward from below with respect to the back surface of said display portion when said stand member is transformed from said first shape into said second shape.

* * * * *